June 8, 1954

W. E. BRIGHT ET AL 2,680,530

ATTACHMENT FOR BALERS

Filed Sept. 24, 1949

INVENTORS
VERN A. HART
BY WARREN E. BRIGHT

*Jerome W Payton*
Agt.

June 8, 1954
W. E. BRIGHT ET AL
2,680,530
ATTACHMENT FOR BALERS
Filed Sept. 24, 1949
2 Sheets-Sheet 2
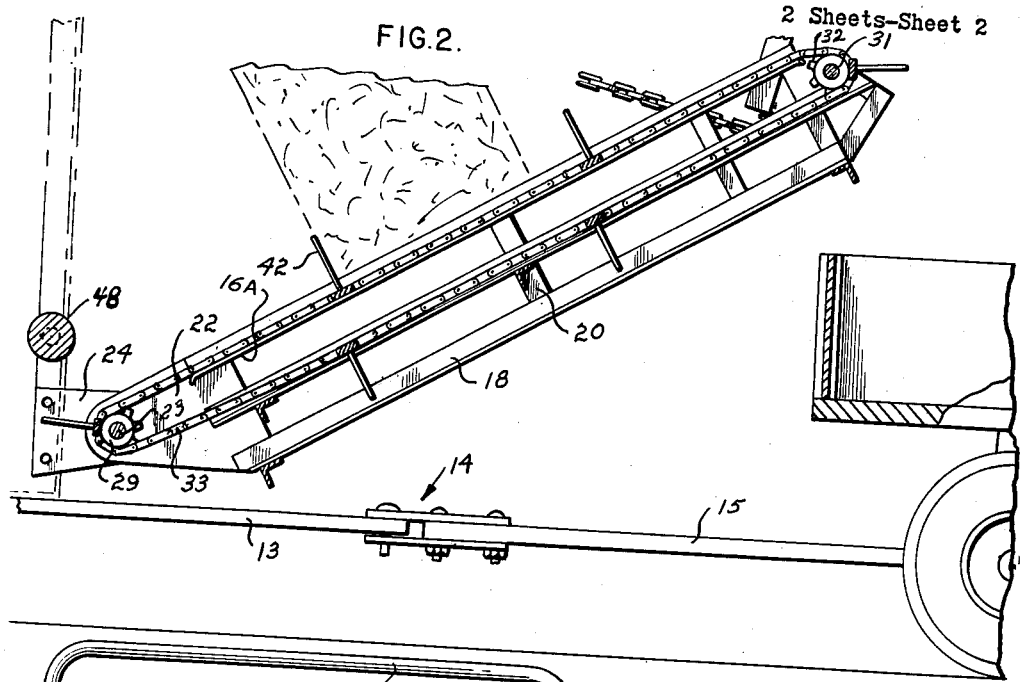
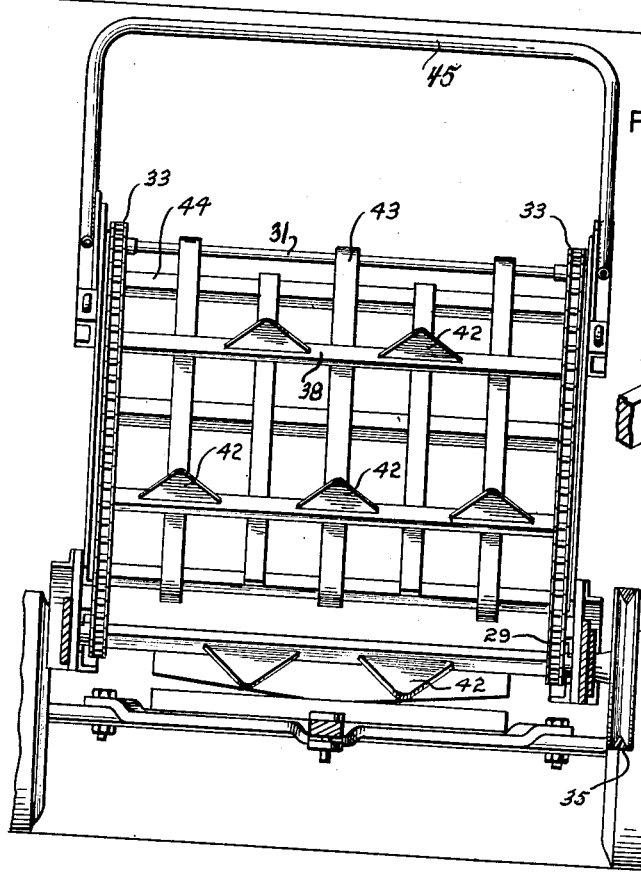
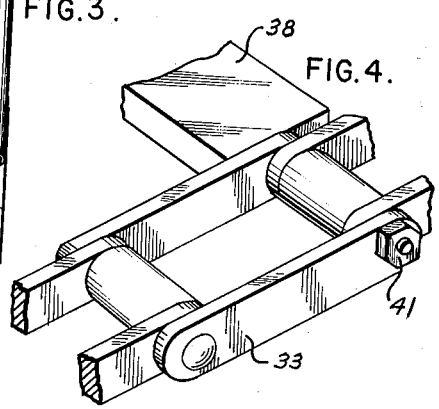
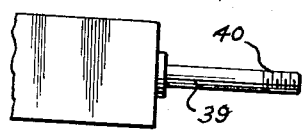
INVENTORS
VERN A. HART
WARREN E. BRIGHT
BY Patented June 8, 1954

2,680,530

UNITED STATES PATENT OFFICE 2,680,530

ATTACHMENT FOR BALERS

Warren E. Bright, Findlay, and Vern A. Hart, Vanlue, Ohio

Application September 24, 1949, Serial No. 117,636

2 Claims. (Cl. 214—83.26)

The present invention relates to agricultural equipment, and more particularly has reference to means for automatically moving bales from the baling apparatus to a vehicle such as a farm wagon.

Broadly, the invention comprises a framework suitably pivoted to the baler, the framework supporting a conveying assembly and a drive connection between the baler and the conveying assembly to impart movement to the conveying assembly.

An object of the invention is to provide a conveying attachment of the character described which is supported by the baler apparatus and, as a consequence, will move with the baler to provide an easy means for moving the bales to the desired point of deposit.

Yet another object of the invention is to provide a bale moving attachment for use with a baler which is simple in structural detail, positive and efficient in operation, and which may be readily incorporated with conventional balers with a minimum of alteration to the baler.

And yet another object of the invention is to provide a unique drive connection between the bale conveyor and the baler when imparting the desired movement to the bale conveyor.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which:

Figure 2 is a vertical sectional view of the apparatus shown in Figure 1.

Figure 3 is a sectional view taken along the line 3—3 of Figure 1, looking in the direction of the arrows.

Figure 4 is a view in perspective partly broken away, showing the manner in which the movable cross bars of the conveyor are attached to the drive chain.

Figure 5 is a plan view of one end of the cross bar.

Figure 1:
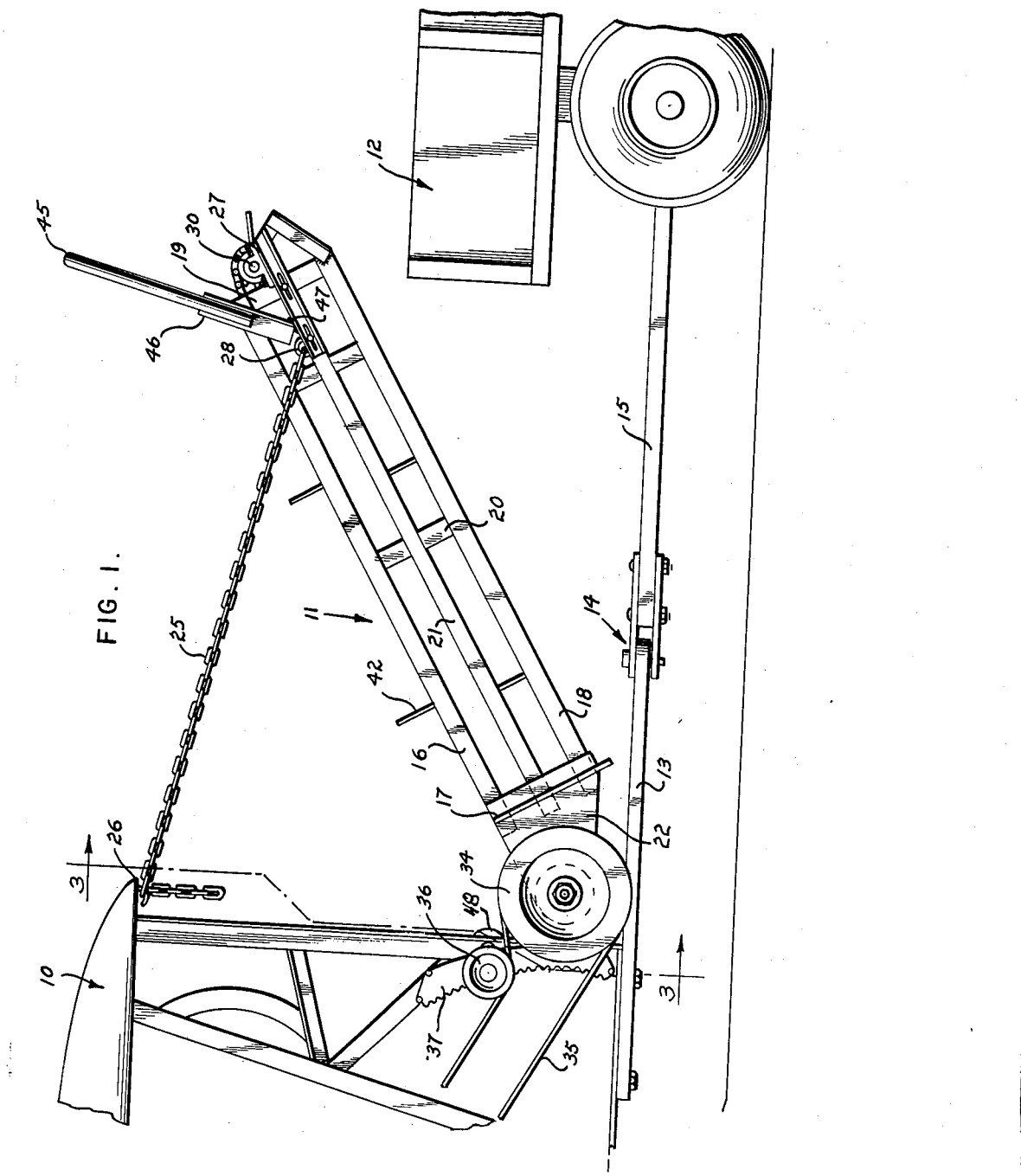
Figure 1 is a view in side elevation, showing the bale moving assembly in operative position on the baler in order to move the bales to the farm vehicle.

Referring to Figure 1, we have designated a baler apparatus of conventional design by the numeral 10, 11 denotes the bale moving assembly, and 12 the vehicle into which the bales are to be loaded or deposited. The baler 10 may be provided with a tongue or the like 13, which is coupled, as shown at 14, to tongue 15 of the towing vehicle 12. The bale moving assembly 11 comprises longitudinally extending side members 16 which are suitably secured at their ends to a plate or other support 17 disposed at right angles thereto. A second pair of longitudinally extending members 18 are in spaced parallel relation to the members 16 and are similarly attached to the plate 17. The opposite end of each of the members 16 and 18 is secured by welding or the like to a similar plate 19. Braces 20 are conveniently attached to the members 16 and 18 at suitable locations intermediate the plates 17 and 19 and while we have illustrated the use of two such braces, it is obvious that a more or less number may be employed, depending upon the particular problems encountered. An angle iron 21 is located equidistant between each of the pairs of longitudinal members 16 and 18 and is attached to the plates 17, 19, and the braces 20 by welding or brazing the vertical flange of the angle iron to such members, and the purpose of the angle iron will later be more fully discussed.

A substantially triangular plate 22 is secured to each of the lowermost plates 17, and a shaft 23 extends transversely of the bale moving assembly 11 and is journaled in alined apertures provided in the plates 22, the shaft similarly extending through alined openings in a pair of brackets 24 suitably secured to the frame of the baler 10 in order that the bale moving assembly may have pivotal movement relative to the baler. In order to support the bale moving assembly 11 at various angular positions relative to the baler, it will be noted that a chain or the like 25 is attached at one end to a hook 26 carried by the baler, and at the opposite end to a channel bar 27 adjustably mounted on the angle iron 21 adjacent the upper end of the bale moving assembly by means of an eye or the like 28. Consequently, by placing the proper length of the chain on the hook 26, the bale moving assembly may be properly secured in the necessary position.

A pair of sprockets 29 are keyed to the shaft 23 adjacent to the triangular plates 22 and it will be observed in Figures 2 and 3 that the sprockets are in alinement, so to speak, with the horizontal flanges of the angle irons 21. A bearing block 30 is secured to the upper horizontal flange of each of the channel bars 27, and a shaft 31 is suitably journaled in the blocks 30. A pair of sprockets 32 are secured to the shaft 31, the sprockets 32 being in alinement with the sprockets 29 and the horizontal flanges of the angle irons 21. A drive chain 33 is trained over each of the pairs of sprockets and the lower flight of the chain will rest on the angle irons 21. A pulley 34 is secured to one of the free ends of the shaft 23, and the pulley preferably has a diameter of 15 inches. A belt 35 is trained around the pulley 34 and the opposite end around a pulley on the baler (not shown), and an additional pulley 36 is in engagement with the belt 35 and the latter pulley may be held in various adjusted positions by means of the arcuate rack or segment 37 of the baler 10. Consequently, it can be seen that the power plant of the baler will function to rotate the pulley 34 which, in turn, will impart movement to the chains 33.

Certain of the links of the chains 33 support laterally extending elements 38 which are of such length as to span the distance between the chains. More specifically, the element 38 is provided at each end with a rod 39 having a threaded portion 40, and the rod 39 is of such length as to extend through said elements of the link chain as well as the roller and be secured thereto by a nut or the like 41 drawn up on the threaded portion 40. While we have shown the use of six such laterally extending elements 38, a more or less number may be employed, depending upon the particular problems encountered. Each laterally extending element 38 has a plurality of lugs or plates 42 welded or otherwise secured thereto in order to impart movement to the bales deposited upon the bale moving assembly, and each of the lugs is of a height to extend approximately the distance between the angle irons 21 and the longitudinally extending members 18. The upper flight of each of the chains 33 may be supported by the horizontal flange 16A of the member 16 which, of course, with the comparable support for the lower flight will prevent any appreciable sagging of the chains. Furthermore, the laterally extending elements 38 may be given added support by means of the longitudinal support bars 43 suitably secured to transverse elements 44 affixed at each end to the longitudinal members 16.

A tubular approximately U-shaped guard 45 is secured adjacent the upper end of the bale moving assembly 11 by brackets 46, the lower ends of which are welded or otherwise secured to the channel bars 27, as indicated at 47. A roller 48, preferably of wooden construction, is rotatably mounted in the framework of the baler 10 at a point immediately above the brackets 24 in order that the bales may be easily moved onto the upper flight of the bale moving assembly.

While it is felt that the operation of the above apparatus is entirely clear, it may be briefly summarized as follows:

The chain 25 is manipulated to position the bale moving device 11 at the proper angle with respect to the wagon into which the bales are to be loaded, and the chain is then secured to the hook 26. The baled material is then moved over the roller 48 and deposited upon the moving assembly 11. Assuming that power has been imparted to the pulley 34, the chains 33 are, of course, in movement, thereby imparting simultaneous movement to the lateral elements 38, and as soon as the lugs 42 carried by the element 38 come into contact with the bale, the bale will be moved upwardly under the guard 45 and thus deposited into the wagon 12. Of course the speed at which the chains move can be regulated by the adjustment of the idler pulley 36 and any slack in the chains can be taken up by adjustment of the channel bars 27. Furthermore, the adjustable nature of the bars 27 will enable the chains to be readily removed from the sprockets for repair or replacement purposes, and similarly, it is a simple matter to remove the lateral elements 38 from the chains 33. Hence, it can be seen that we have provided a relatively simple structural arrangement for moving bales from the baler to a wagon or other type farm vehicle which may be readily and easily installed on the majority of conventional balers. There are few essential parts that are subject to breakage or damage and the equipment may be easily and inexpensively manufactured.

We claim:

1. An attachment for balers having a power source adapted to move the bales from the baler to a towing wagon or the like comprising a framework pivotally attached at one end to the baler and extending forwardly in the direction of travel of the wagon, a shaft journalled in the framework adjacent the end of the framework pivoted to the baler, a pair of spaced apart parallel arms mounted on the opposite end of the framework for longitudinal movement relative to the framework, complemental means on the framework and arms to secure said arms in the desired position relative to the framework, a second shaft journalled in the said arms, a pair of sprockets carried by each of said shafts, an endless chain trained around each pair of sprockets, longitudinally extending members on said framework below said chain to support the chain, a plurality of bars detachably connected to said chains and spanning the gap between the chains, pusher plates supported by said bars, means connected to the baler and to one of said parallel arms to maintain the framework at the desired angle with respect to the baler and a drive connection between one of said shafts and the power source whereby movement is imparted to said chains and pusher plates.

2. An attachment as claimed in claim 1 wherein said drive connection includes means to vary the speed at which the chains and bars move.

References Cited in the file of this patent

UNITED STATES PATENTS

| Number | Name | Date |
|---|---|---|
| 1,301,642 | Bradney et al. | Apr. 22, 1919 |
| 1,310,187 | Hodgson | July 15, 1919 |
| 1,857,373 | Goggins | May 10, 1932 |
| 2,334,304 | Arnett et al. | Nov. 16, 1943 |
| 2,402,465 | Templeton | June 18, 1946 |
| 2,439,040 | Cohen | Apr. 6, 1948 |
| 2,460,441 | Appel | Feb. 1, 1949 |